United States Patent [19]
Salm

[11] Patent Number: 5,819,388
[45] Date of Patent: Oct. 13, 1998

[54] PROCESS AND DEVICE FOR PRODUCING A WORKPIECE

[75] Inventor: Thomas Salm, Aachen, Germany

[73] Assignee: MEC Maschinenbau Entwicklung Consulting GmbH, Alsdorf, Germany

[21] Appl. No.: 648,105

[22] PCT Filed: Nov. 25, 1994

[86] PCT No.: PCT/EP94/03902

§ 371 Date: May 14, 1996

§ 102(e) Date: May 14, 1996

[87] PCT Pub. No.: WO95/15254

PCT Pub. Date: Jun. 8, 1995

[30] Foreign Application Priority Data

Nov. 30, 1993 [DE] Germany ............... 43 40 646.7

[51] Int. Cl.$^6$ .................................................. B23P 17/00
[52] U.S. Cl. ...................... 29/424; 29/425; 29/466; 29/468; 364/474.24
[58] Field of Search ........................ 29/424, 466, 468, 29/425; 364/474.01, 474.02, 474.24, 468.25; 76/DIG. 6; 156/250, 256, 267; 83/76.9; 409/80, 84

[56] References Cited

U.S. PATENT DOCUMENTS

| 3,932,923 | 1/1976 | DiMatteo . |
| 4,680,852 | 7/1987 | Centore .................................. 29/466 |
| 5,031,120 | 7/1991 | Pomerantz et al. ............... 364/474.24 |
| 5,031,483 | 7/1991 | Weaver . |
| 5,071,503 | 12/1991 | Berman . |
| 5,156,700 | 10/1992 | Berman et al. ......................... 156/250 |
| 5,183,598 | 2/1993 | Hellé .................................. 156/267 |
| 5,354,414 | 10/1994 | Feygin .................................. 156/267 |
| 5,432,704 | 7/1995 | Vouzelaud et al. ............... 364/474.24 |
| 5,663,883 | 9/1997 | Thomas et al. ..................... 364/474.24 |

FOREIGN PATENT DOCUMENTS

| 0 369 909 A1 | 5/1990 | European Pat. Off. . |
| 0 490 546 A1 | 6/1992 | European Pat. Off. . |
| 0 554 033 A1 | 8/1993 | European Pat. Off. . |
| 37 11 470 A1 | 10/1988 | Germany . |

OTHER PUBLICATIONS

Von Thomas Schätti, date unknown, Rapid Prototyping etabliert sich, Technische Rundschau 20/91.

*Primary Examiner*—David P. Bryant
*Attorney, Agent, or Firm*—McGlew and Tuttle

[57] ABSTRACT

The invention concerns the creation of a prototype workpiece or production equipment. To produce such prototypes quickly and cost-effectively and to produce functional prototypes from any type of material, the invention proposes that a defined geometric description be broken down in the computer into 3D segments which are then broken down into plates of varying thickness, the cutting planes of each individual plate being chosen so that each plate can be machined in two clampings without undercutting, the plates being made from blanks of suitable thickness and assembled to form a workpiece in that production equipment is used to machine the individual blanks in succession, starting from any plate, so as to create the cutting surfaces and body contours and then adjacent plates are joined together at the machined surfaces to form the workpiece, whereupon this second plate that is now joined to a first plate is machined on the production equipment from its now free surface to create the next cutting surface and other contours of the plate, all projecting ends being removed in the process, while the next adjoining plate is machined on its free surface to form at least parts of the body contour of the plate and the cutting surface and the laid against the free cutting surface of the previously machined plate and joined to this plate, whereupon this third plate that is now joined to the second plate is machined from its now free surface in the same way as the second plate, while the next adjacent plate is machined on the production equipment in the same way as the preceding plate until all plates have been machined on the production equipment in the same way as the preceding plate until all plates have been machined and joined together, whereupon any remaining support material is removed through another machining operation.

9 Claims, 3 Drawing Sheets

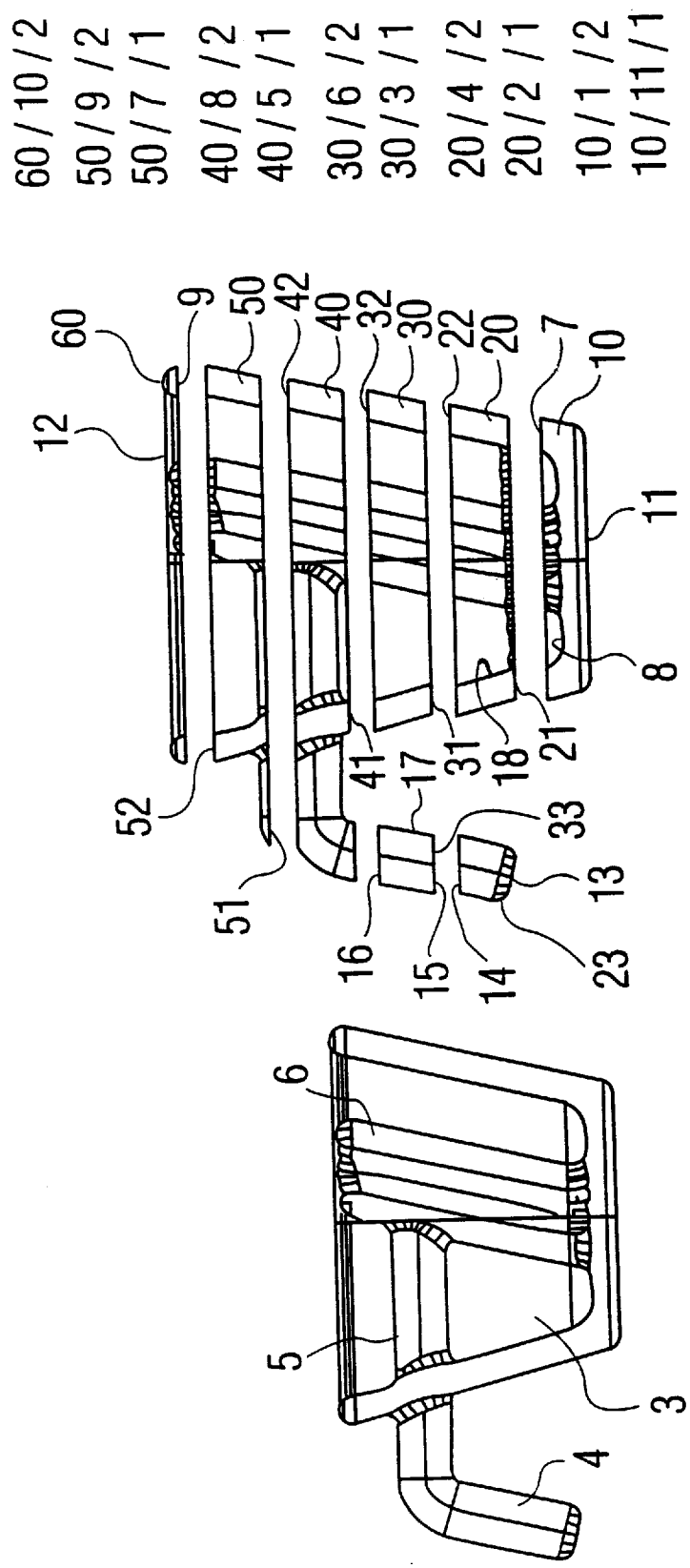

Fig. 5
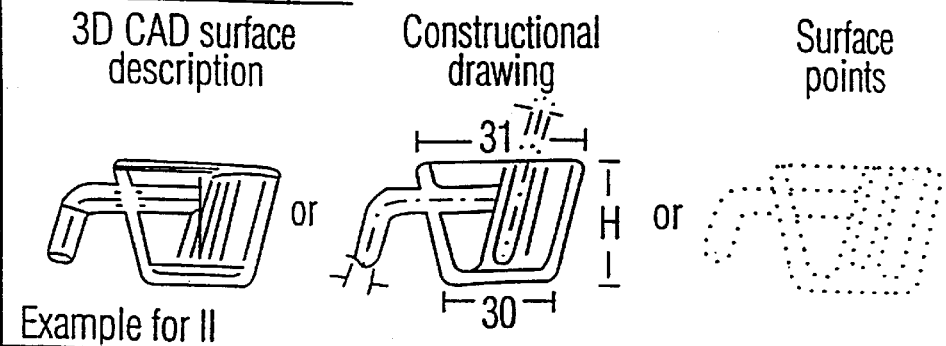
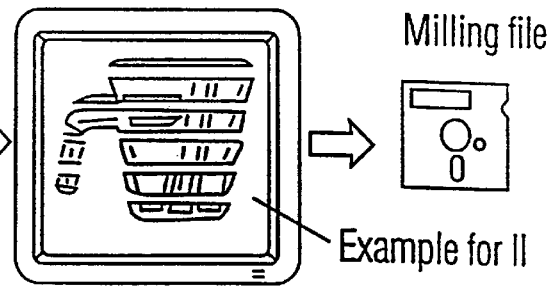
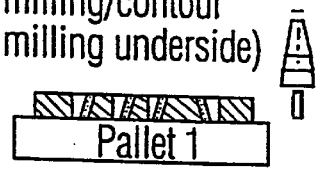
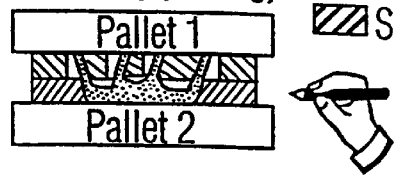

PROCESS AND DEVICE FOR PRODUCING A WORKPIECE

BACKGROUND OF THE INVENTION

The present invention pertains to a process for preparing a workpiece used as a prototype, as well as to a device for carrying out the process.

FIELD OF THE INVENTION

It can be observed that the life of products is becoming shorter and shorter, so that the preparation of prototypes for further experiments or as display material is of significance for the further development of existing products or for the development of new products. Such a prototype can be prepared either as a functional model or as a design example. Various methods have been developed in the state of the art for preparing such prototypes, which can be used at least as design models. Such methods have become known, e.g., under the names stereolithography, photopolymerization, laser cutting of paper, polyester, or cellulose, 3-D modeling of wax or nylon, or laser sintering of PVC, wax, or nylon. However, these processes have substantial disadvantages in terms of the processability of the material used, the surface finish and the load-bearing capacity of the prototype prepared. Frequently these processes do not make it possible to prepare the prototype economically. The preparation of prototypes is regularly under pressure of time, it requires an efficient product, low production costs, and the ability to rapidly respond to changing demanding markets even in the case of complex parts. Moreover, very expensive special devices are needed for the prior-art procedures described for preparing prototypes. These devices involve high maintenance costs, and they very often can prepare only a first step for a prototype if the prototype is to be cast and the first step consequently represents a casting pattern which is prepared according to the prior-art processes. Aging phenomena (e.g., shrinkage due to drying), which occur on a prototype prepared in this manner, and the need for a comprehensive finishing need be taken into account as well.

DE-A-3711470 shows a process for preparing a three-dimensional model composed of a plurality of disks, e.g., a vehicle model, wherein the shape of the model is divided by a computer into disks. The disks are then cut out of a suitable plate material as a disk blank by means of laser beam and are assembled using, e.g., fixing rods, into an approximate contour model. The contour model subsequently smoothed manually or by means of laser beams.

Even though the contour of a model can be prepared with this process in a layered design, the disk blanks have a uniform thickness, which are subjected to a contour machining in their edge zones only to obtain the desired shape of the model.

EP-A-0 490 546 also shows a process for preparing a three-dimensional object composed of a plurality of relatively thin plates, wherein the individual plates are punched out of a strip-like material in the manner of a punching process and are stacked one upon the other to form the object. The surfaces of the plates which are adjacent to each other on the finished object are coated before the stacking process with an adhesive, e.g., wax or another adhesive material, in order to secure their relative position, which forms the contour of the object.

Both cylindrical hollow bodies with different diameter ranges and bodies having other geometric shapes can be prepared according to this process in a layered design, but the application of this process is limited to the preparation of objects which are not subjected to machining any more after the stacking of the individual plates.

A similar process, as well as a device for carrying out this process, are described in EP-A-0369909. The geometric data of the model to be prepared are entered here into a computer, which determines from these the manufacturing data of individual disks forming the model, and these data will then be used to control the work movements of a tool, e.g., a milling cutter of a 2-D or 3-D tool machine.

U.S. Pat. No. 5,071,503 also shows a process and a device for carrying out same for producing a workpiece to be made in a layered design. This workpiece is formed by a plurality of plates of equal thickness, wherein each of the plates is connected, before its intended machining, to the plate which is adjacent to it in the finished workpiece. The intended machining forming the contour of the plate by the tool of a 3-D tool machine. The plate is consequently already finish-machined, in order to be contoured in turn after the connection process.

Finally, a process as well as a device for carrying out this process for preparing an injection or casting mold consisting of a top part and a bottom part have been known from U.S. Pat. No. 5,031,483. Both the bottom part and the top part of this mold consist of a plurality of plates stacked on one another, wherein each of the plates is subjected to machining by means of a corresponding tool to form its contour. The working movements of the tool are also controlled by a computer, which determines the data of the contours of the individual plates from the geometric data of both the top and bottom parts of the mold to be prepared, and these contour data are then used to control the machining tool.

The workpiece to be prepared is divided in all these prior-art processes into a plurality of plates of uniform thickness, whose geometric data are defined on the basis of the preselected plate thickness, and which are then used to control a machining tool. Since the contours of the workpiece to be prepared are more or less ignored when the workpiece to be prepared is divided into a number of plates to be stacked on one another, wherein the number of plates corresponds to the number necessary for forming the workpiece, none of the above-described processes makes it possible to prepare workpieces having complicated shapes without undercuts.

This object is accomplished, based on a process of the above-described type, by performing a division of the model into different 3-D segments in a computer on the basis of a defined geometric description, and by dividing this model of 3-D segments into plates of different thickness. The sectional planes or width of every individual plate are selected to be such that each plate can be machined in two settings without undercut. The plates are prepared from blanks of a suitable thickness and are assembled into the workpiece by machining the sides of the individual blanks one after another, starting from any desired plate, to prepare the cut edges and body contours by means of a machining unit. Adjacent plates are subsequently connected to one another on already machined surfaces to form the workpiece. After which this second plate, connected to the first plate, is machined from its now free surface on the machining unit to prepare the next cut edge and additional contours of the plate, while removing all unnecessary projections in the process. The next adjacent plate is then machined on the free surface to form at least parts of the body contour of the plate and of the cut edge, and it is then placed against the free cut edge of the previously machined plate and is connected to this plate. After which this third plate, now connected to the second plate, is machined from its now free surface in the same manner as the second plate was, while the next adjacent plate is machined on the machining unit in the same manner as the preceding plate was. This is done until all plates are machined and connected to one another. After which support material that may have been left in place is removed in another machining operation.

The different 3-D segments mentioned occur on, e.g., multiply divided permanent molds with slides or, e.g., in divided foam molds. This process makes it possible to use machining units which are, e.g., CNC-controlled, are available in most workshops anyway, and whose control commands can be derived from a description of the body which is present in the computer. Due to the arrangement of the cut edges according to the present invention, which may have any desired shape and may optionally also be curved, the workpiece to be prepared is divided into a plurality of plates of different thickness, and the cut edges of the plates are located such that machining without undercuts is possible in two settings, as a result of which complicated machining operations can be avoided. The individual plates of the workpiece are consequently prepared one after the other and after a partial machining they are connected to a previously prepared adjacent plate. They are then finish-machined in this connected state on the second side. To prepare such a connection, the plate, which is already machined on its first cut edge and is also partially contoured, is detached with its holding device from the tool machine and is transferred, e.g., into a joining press, in which another pallet with the first plate or with the plates already joined is located, so that the additional plate can be joined and connected, e.g., by pressing and/or with suitable connecting means.

This joining press may be present as an auxiliary unit in the first machining unit and it can be built up there in a functioning manner, or it may be a special device, which is independent from the tool machining units. It is thus possible to do without special machines and complicated and expensive processes.

In addition, it is also possible to prepare lost patterns or molds from polystyrene, wax or wood in this manner, wherein the patterns thus prepared can be sacrificed or lost in the subsequent casting process, and a prototype is obtained by precision casting or full mold casting.

The machining of lost patterns, e.g., from plastics, requires shorter milling times and a prototype is obtained as a homogeneous component as a result. A component of high strength, which meets the requirements imposed in terms of dimensional stability, just as well as a component machined with undercuts in the prior art manner, is obtained in the case of the manufacture according to the process according to the present invention directly in the target material, e.g., metal. Subsequent processes, e.g., the casting of a lost pattern, are no longer necessary.

In particular the following advantages are achieved with the process according to the present invention:

A prototype can be manufactured at low cost due to the use of existing machining units, the investment for auxiliary devices that may be necessary is low, a prototype can be manufactured directly from the target material without intermediate or subsequent steps, due to the use of suitable tools and materials, it is possible to prepare prototypes which can be subjected to thermal and mechanical load and stress, good surface finish is obtained by machining, e.g., CNC controlled milling, complex parts can be manufactured in short machining times with close tolerances, and the prototypes manufactured are especially suitable for demanding applications, e.g., as complex castings, flow models with polished surfaces in poorly accessible geometry, plexiglas models for photoelasticity, forging tools for sampling and as chills, diecasting molds and injection molds.

It is favorable for the workpiece to be divided into at least three plates for CAD. A workpiece is obtained in this case with a middle plate limited by two cut edges, and with end plates on each side of the two cut edges. The end plate has only one cut edge. The cut edges are logically placed such that the plate limited by two cut edges has a constant thickness, i.e., the two cut edges extend in parallel at a constant distance from each other.

However, as a difference from this, the process is also suitable for use for plates whose cut edges form an angle with one another or extend in a curved shape. It is advantageous in this connection for the mounting plates or pallets used to clamp the plate to also be able to be brought into an angular position in relation to one another. Plates with cut edges forming an angle with one another may be considered, e.g., in the case of workpieces which have marked curvatures or in which projections or undercuts occur, which have only a small extension in relation to the other parts of the workpiece; gearbox cases and forming tools are sufficient examples of this.

The minimum thickness of a plate shall be selected, in principle, to be such that the cutting forces and even thermal loads that may occur during machining can be absorbed without elastic or plastic deformation or with only minimal elastic or plastic deformation even during the manufacture of thin wall contour areas. These effects can be reduced during machining processes by the use of high-speed spindles.

Two mounting plates are usually sufficient for carrying out the process. There is no reason not to increase this number as desired, e.g., in the case of the manufacture of workpieces with widely projecting parts. The use of a third or fourth mounting plate and additional machining on additional tool machine to possibly reduce the machining times may be advantageous in the case of the machining of plates belonging to such parts.

A workpiece to be processed exclusively by machining, e.g., by milling, was selected as the exemplary embodiment. It is, of course, possible to use all machining manufacturing processes or manufacturing processes in which material is removed in any other way, e.g., erosion or laser processes, etc. It is also possible to use work processes which additionally bring about only a local structural change in the material used.

Additional advantageous embodiments of the process as well as the design of the machining units will appear from the other claims.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 shows the CAD geometry of a workpiece,

FIG. 2 shows the division of the CAD geometry into a plurality of surface strips or plates, FIG. 3 shows the sequence of the machining steps and of clamping with respect to the surface strips according to FIG. 2, wherein the view to the left illustrates the first machining and the view to the right the second machining of the plates, FIG. 5 shows a schematic representation of the process.

DESCRIPTION OF THE PREFERRED EMBODIMENT

Figure 4:
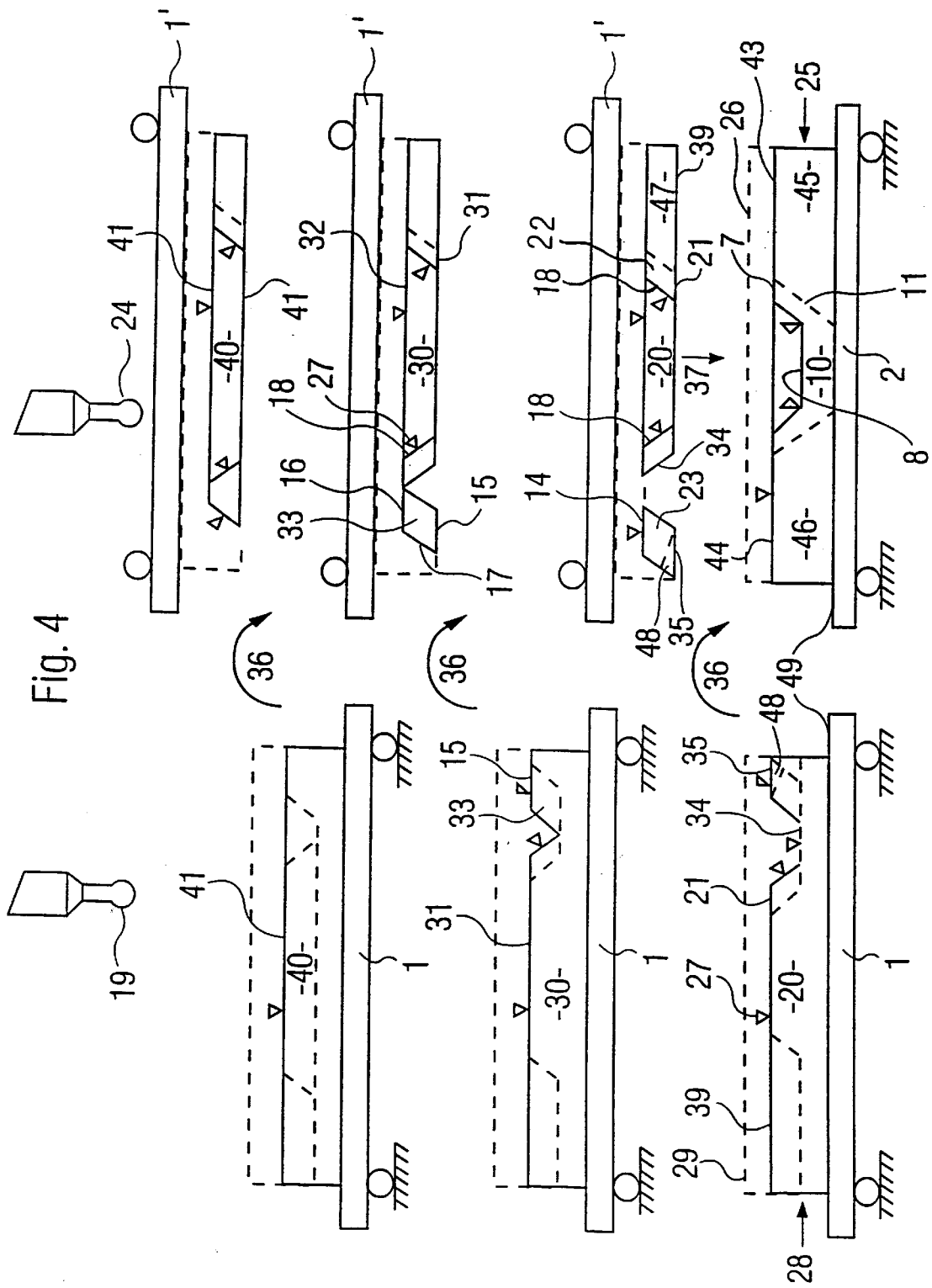
FIG. 4 shows a graphic representation of a detail of the sequence of the machining steps and of clamping.

Referring to the drawings and in particular to FIG. 1, the workpiece 3 has the shape of a cup with a widely projecting handle 4 and inner projections 5 as well as recesses 6. The CAD geometry of the workpiece 3 is divided into a plurality of consecutive plates or layers 10, 20, 30, 40, 50, and 60, which also have different thicknesses. The contours of the lower or first plate 10 are limited by the only cut edge or side 7, the outer surface 11, and the inner surface 8. This is analogously also true of the top plate 60, which is limited by cut edge or side 9 and outer surface 12. The plates 20, 30, 40, and 50 located between the bottom or first plate 10 and the top or last plate 60 are each limited at the bottom and at the top by two cut edges or sides each, namely, a corresponding first cut edge 21, and a corresponding second cut edge 22, the cut edges and 31, 32 and 41, 42 and 51, 52, respectively. This is analogously also true of the handle 4 as well, which is divided in the extension of the plates 20 and 30 into the completely unconnected individual parts 23 and 33, respectively. The individual part 23 is limited by the outer surface 13 and cut edge 14, which is located in the plane of the cut edge 22. The superjacent cut edge 33 corresponds to the plate 30 and it is limited by the two cut edges 15 and 16, which are located in planes corresponding to the cut edges 31 and 32 respectively, and by the outer surface 17. This is analogously also true of the plates 40 and 50 as well, as is clearly apparent from FIG. 2.

FIG. 3 shows a machining diagram in three columns, whose individual lines are associated with the respective plates 10, 20, 30, 40, 50, and 60. The numbers of the plates are shown in the left-band column, beginning with 10 from the bottom. The middle column contains a sequence of machining steps with the step numbers [1] through [11], but these numbers are not identical to the above reference numbers used here. The reference numbers 1 and 2, which designate the mounting plates or pallets 1 and 2, alternate with one another in the right-hand column.

In a synopsis of FIGS. 2 and 3, e.g., the step number [3] in the middle column of FIG. 3 means the machining of the bottom or first cut edge 31 of plate 30 in FIG. 2.

Step number [6] in the middle column of FIG. 3 correspondingly means, in conjunction with number 2 in this figure, the machining of the top cut edge 32 of plate 30.

The numerical sequence of the step numbers [1] through [11] in the middle column of FIG. 3 consequently shows the process steps with which the plates 10, 20, 30, 40, 50, and 60 are machined one after another. This sequence is not compulsory. In a broader sense of the present invention, the machining of the workpiece 3 may begin with any of the plates 10, 20, 30, 40, 50, or 60.

For completeness' sake, the reference number 18 designates the inner surface of the workpiece 3, which is composed of the partial surfaces of the insides of all plates 20, 30, 40, 50, and 60, and passes over into the inner surface 8 of the bottom plate.

The left-hand half of FIG. 4 shows the mounting plate or pallet 1 and the milling cutter 19 associated with it. The right-hand half shows the mounting plate 2 with the milling cutter 24 associated with it. The milling cutters 19 and 24 may also be identical, i.e., machining can be performed with both milling cutters 19 and 24 on both the mounting plate 1 and the mounting plate 2. The use of a single milling cutter 19 or 24 is sometimes also sufficient for both mounting plates or pallets 1 and 2.

A blank 25, on which the machining begins, is mounted on the mounting plate 2. The volume 26, which is indicated by the broken line, is removed by machining from this blank 25 with the milling cutter 24 in a first work step [1]. The cut edge 7 and a part of the workpiece contour, namely a section of the inner surface 8 of the bottom plate 10 are thus formed. The inverted triangles 27 indicate the actually machined surfaces. The blank 28 is machined on the mounting plate 1 simultaneously or subsequently. The volume 29 is removed by machining with the milling cutter 19, and the first cut edge 21 and another part of the workpiece contour, namely the sections of the outer contour 34 of plate 20, as well as a cut edge 35, which is associated with the individual part 23, are formed. If parts of the body being manufactured which are not connected to one another within the plate thickness are formed during the machining of a plate, a support web may initially remain between these parts. The free space prepared by the milling cutter along the circumferential contour may be filled with a rapidly solidifying and easy-to-remove support material in order to establish or improve the connection between such individual elements.

Together with the blank 28 mounted on the mounting plate 1, which has meanwhile been machined on one side, the mounting plate 1 is transferred into position 1' by displacement and pivoting in the direction of the curved arrow 36. The two mounting plates 1 and 2 are latched to each other in this position. Usual indexing means corresponding to one another (not shown) on the mounting plates 1 and 2 guarantee that the two cut edges 7 and 21 of the respective plates 10 and 20 coincide with one another in terms of the CAD geometry during the indexing during the preceding lowering of the two mounting plates 1 and 2 in the direction of the arrow 37. Reference points (not shown) on the mounting surfaces 49 of the two mounting plates 1 and 2 make possible the mutually coordinated orientation of the position of the blanks 25 and 28 during the mounting and during milling, which makes it possible to achieve coincidence of the cut edges 7 and 21.

The plates 10 and 20, which have been made to coincide and have meanwhile been machined on one side, are then firmly and permanently connected to one another at their common cut edges 7 and 21. The two mounting plates 1 and 2 are subsequently detached from one another, while the plate 20, already machined on one side, is, of course, also separated at the same time from the pivoted mounting plate 1'. The latter is returned into its starting position.

The volume 38 is then removed by machining by means of the milling cutter 24. The second cut edge 22 of the plate 22 and the cut edge 14 of the handle 4, as well as sections of the inner surface 18 are thus formed in the process.

If the cut edges 7 and 21 connected to one another are not large enough to transmit the forces generated during the removal by machining of the volume 38 to the mounting plate 2, it may be favorable or even necessary to leave in place, during the removal by machining of the volume 29, additional surface sections 39, which are then connected to the remaining surface sections 43 of the plates 10 machined on one side. This analogously applies to the remaining surface sections 44 which are left in place, which are needed for fixing the cut edge 35. Once the entire workpiece 3 has now been built up by analogous machining of the remaining plates 30, 40, 50, and 60, it is turned and is mounted with the outer surface 12 on one of the mounting plates 1 or 2. Another part of the workpiece contour, namely the entire outer surface 11, 13, 17, and 34 is produced by the final removal by machining of the respective volumes 45, 46, 47, and 48 left in place. The workpiece 3 finally acquires its final shape defined by the CAD geometry by performing finishing operations that may be necessary on the inner surfaces 8 and 18.

The firm connection between the individual plates 10, 20, 30, 40, 50, and 60 is brought about in a positive-locking, material-incorporated, or force-locking manner, or by combinations thereof. To apply a pressing pressure, e.g., to prepare a bonded connection, a joining device is usually associated with the mounting plate 2.

The connection of the individual plates 10, 20, etc can be brought about in many different ways by the present invention.

The individual plates 10, 20, etc may be connected to one one another in a positive-locking manner, which is achieve, e.g., by means of so-called alignment pins. To do so, one of the plates to be connected has a plurality of holes, while the corresponding other plate is provided with the alignment pins in the corresponding areas, and the alignment pins will then engage the holes, as a result of which the relative position of the two plates is secured. This could also be achieved, e.g., with a tongue-and-groove connection.

The "material incorporated" connection means a simple bonded connection, in which adhesive is introduced between the plates to be connected to one another.

The connection referred to as "force-locking manner" means is a connection in which the plates are held in their relative position by the application of external forces. This can be achieved, e.g., by the upper plate being pressed by a die pressing its top side against the corresponding other plate, so that the two plates cannot move relative to one another.

FIG. 5 graphically shows the schematic process of prototype manufacture. The process is divided into three areas, which are designated by I, II, and III, wherein the area marked by III is further subdivided into four machining steps.

The geometric description of the workpiece to be produced is symbolized in area I. The geometry may be described in various ways. Three of these possibilities, namely, the 3D-CAD surface description, the constructional drawing, and the computer imaging over surface points, are indicated. In area II, the processing of the geometry and the geometry of the workpiece is determined and stored by the computer. The determined and stored geometry is then divided by determining corresponding section lines, so that plates will be defined, as is symbolized in the middle figure under II. The geometry determined and the division defined may now be stored in, e.g., an external memory, such as a diskette, and be transported to the control unit, e.g., a CNC-controlled milling machine, and be taken over there. The data may have been prepared in such a form that they can be directly processed by the control unit of the machine. However, it is also possible to prepare the data in the machine control unit after they have been taken over into a corresponding memory of the machine control unit. The control data may be entered, e.g., into a CNC-controlled milling machine, of which a tool and a corresponding mounting plate or pallet are symbolically represented under III in the first machining step on the left-hand side. The second plate under II is machined on a first side on the mounting pallet 1 during this sequence of operation shown there. The mounting pallet 1 with the second plate of the workpiece is brought to the joining press, and is arranged opposite the mounting pallet 2 already machined, as is shown in the figure under the heading "Machining Step 2". The two mounting pallets and consequently also the corresponding plates are moved toward each other in this arrangement until their corresponding opposite surfaces mutually come into contact with one another, and the second plate and the first plate are then fastened to one another. The mounting pallet 1 is now detached from the second plate, and the mounting pallet 2 with the two plates is placed on a work table in a 3"Machining Step," which is also so designated in the drawing, in order to carry out a manual finishing as may be necessary and/or to introduce a support material. Once this has been done or if this is not necessary, the mounting pallet 2 with the two plates is again taken up on the CNC-controlled milling machine, and the second plate is machined on its second side in a 4"Machining Step." The next blank is subsequently fastened on the mounting pallet 1 for machining the third mounting pallet after which the mounting pallet 2 with the entire part joined so far and the mounting pallet 1 with the next plate are again brought to the joining device for carrying out the joining process, so that the described process is now repeated as often as is required by the nature of the workpiece.

While specific embodiments of the invention have been shown and described in detail to illustrate the application of the principles of the invention, it will be understood that the invention may be embodied otherwise without departing from such principles.

APPENDIX
List of Reference Numbers Used
1 Mounting plate
1' Mirror-inverted mounting plate
2 Mounting plate
3 Workpiece
4 Handle
5 Inner projections
6 Inner recesses
7 Cut edge
8 Inner surface
9 Cut edge
10 Bottom plate
11 Outer surface
12 Outer surface
13 Outer surface
14 Cut edge
15 Cut edge
16 Cut edge
17 Outer surface
18 Outer surface
19 Milling cutter
20 Plate
21 Cut edge, bottom
22 Cut edge, top
23 Individual part
24 Milling cutter
25 Blank
26 Volume removed by machining
27 Machined surface
28 Blank
29 Volume removed by machining
30 Plate 31 Cut edge, bottom
32 Cut edge, top
33 Individual part
34 Outer surface
35 Cut edge
36 Direction of displacement and pivoting
37 Lowering
38 Volume removed by machining
39 Additional surface section
40 Plate
41 Cut edge, bottom
42 Cut edge, top
43 Additional surface section
44 Additional surface section
45 Volume left in place
46 Volume left in place
47 Volume left in place
48 Volume left in place
49 Mounting surface
50 Plate
51 Cut edge, bottom
52 Cut edge, top
60 Plate

I claim:

1. A process for producing a workpiece, the process comprising the steps of:

designing a shape of the workpiece;

dividing the shape of the designed workpiece into a plurality of layers, a side of each of said layers adjacent to an abutting layer being a cut side, said cut sides of said each of said plurality of layers being located at positions of said workpiece to cause all contours of said shape to be accessible to available machining operations from said cut sides;

providing a plurality of plates;

machining a first plate of said plurality of plates, said machining of said first plate being on one side of said first plate and machining contours corresponding to contours of a first of said layers accessible from one cut side of said first layer;

machining one side of a second plate of said plurality of plates to form contours on said one side of said second plate corresponding to contours accessible from one of said cut sides of a second of said plurality of layers, said one cut side of said second layer being positioned adjacent said one cut side of said first layer;

connecting said one side of said first plate to said one side of said second plate to have said contours of said first and second plates align;

machining another side of said second plate to form contours on said another side of said second plate corresponding to contours accessible from another one of said cut sides of said second of said plurality of layers;

repeating said machining and connecting steps of said sides of said second plate for remaining said plates with respect to corresponding said layers.

2. A process in accordance with claim 1, wherein:

said cut sides of said layers are positioned to remove any undercut contours of the shape from said contours of respective said layers;

said designing of the shape includes dividing the shape into basic 3-D geometric segments;

said machining of said plates includes forming support webs to connect portions of the shape which require additional support until all said plates are connected;

said support webs are removed after all of said plates are connected.

3. A process in accordance with claim 1, wherein:

said first plate is attached to a first mounting pallet;

said machining of said one side of said first plate is performed when said first plate is attached to said first mounting pallet;

said second plate is attached to a second mounting pallet, with said another side of said second plate being positioned adjacent said second pallet;

said machining of said one side of said second plate is performed when said second plate is attached to said second mounting pallet;

said first and second mounting pallets are moved with respect to each other to connect said first and second plates, and said first and second pallets are moved into a predetermined position causing said contours of said first and second plates to be aligned.

4. A process in accordance with claim 3, wherein:

mounting surfaces of said mounting pallets are moved into a mutually mirror inverted position for said connecting, and only one of said pallets is moved during said connecting;

said second pallet is removed from said another side of said second plate prior to said machining of said another side of said second plate.

5. A process in accordance with claim 4, wherein:

said mounting surfaces of said pallets are moved into substantially mutually parallel positions with identical reference systems during said step of connecting.

6. A process in accordance with claim 3, wherein:

said first and second plates are positioned on respective said first and second pallets in mutually mirror-inverted positions.

7. A process in accordance with claim 1, wherein:

said connecting is one of positive-locking, material-integrated, force-locking and a combination thereof.

8. A process in accordance with claim 7, wherein:

said positive-locking connecting being prepared during said machining of said sides of said plates.

9. A process in accordance with claim 1, further comprising the steps of:

providing a solidifying support material into hollow spaces of said plates to give support to parts of the shape;

removing said support material when said plates have been connected together.

* * * * *